United States Patent
Silvester

(10) Patent No.: US 6,879,822 B2
(45) Date of Patent: Apr. 12, 2005

(54) METHOD AND APPARATUS FOR PROVIDING A WIRELESS COMMUNICATION DEVICE WITH LOCAL AUDIO SIGNAL STORAGE

(75) Inventor: Kelan C. Silvester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 480 days.

(21) Appl. No.: 10/028,649

(22) Filed: Dec. 20, 2001

(65) Prior Publication Data

US 2003/0119487 A1 Jun. 26, 2003

(51) Int. Cl.$^7$ .......................... H04M 11/00; H04M 1/66; H04M 1/68; H04M 3/16
(52) U.S. Cl. ................. 455/412.1; 455/413; 379/88.22; 379/88.17
(58) Field of Search .......................... 379/88.07, 88.16, 379/88.19, 88.22, 88.23, 88.24, 88.26; 455/412.1, 412.2, 413, 414.1

(56) References Cited

U.S. PATENT DOCUMENTS

| | | | | |
|---|---|---|---|---|
| RE34,976 E | * | 6/1995 | Helferich et al. .......... 379/88.1 |
| 5,583,915 A | * | 12/1996 | Ishida .................... 455/412.1 |
| 5,740,543 A | * | 4/1998 | Maeda .................... 455/550.1 |
| 5,790,957 A | * | 8/1998 | Heidari ................... 455/553.1 |
| 5,867,793 A | * | 2/1999 | Davis ..................... 455/556.1 |
| 5,995,824 A | * | 11/1999 | Whitfield ................. 455/412.1 |
| 6,192,255 B1 | * | 2/2001 | Lewis et al. ................ 455/558 |
| 6,240,299 B1 | * | 5/2001 | Song ..................... 455/550.1 |
| 6,243,594 B1 | * | 6/2001 | Silberfenig ............... 455/556.1 |
| 6,256,354 B1 | * | 7/2001 | Yoshida et al. ............. 375/244 |
| 6,510,208 B1 | * | 1/2003 | Komiya .................... 379/88.1 |
| 6,546,241 B2 | * | 4/2003 | Iyengar et al. ........... 455/412.1 |
| 6,574,471 B1 | * | 6/2003 | Rydbeck .................... 455/418 |
| 6,580,903 B2 | * | 6/2003 | Hein et al. .............. 455/412.1 |
| 6,690,771 B2 | * | 2/2004 | Siemens et al. ........... 379/67.1 |
| 6,731,723 B1 | * | 5/2004 | Garey ..................... 379/88.1 |
| 2001/0041590 A1 | * | 11/2001 | Silberfenig et al. ......... 455/556 |
| 2002/0137503 A1 | * | 9/2002 | Roderique .................. 455/420 |
| 2003/0032447 A1 | * | 2/2003 | Bulthuis .................... 455/556 |

* cited by examiner

Primary Examiner—Roland G. Foster
(74) Attorney, Agent, or Firm—Blakely, Sokoloff, Taylor & Zafman LLP

(57) ABSTRACT

In accordance with an embodiment of the present invention, a cell phone is integrated with an answering machine. Messages received by the answering machine may be locally stored in a nonvolatile memory region for later retrieval by a user. In addition, for one embodiment, a message may be remotely retrieved by the user by calling the cell phone. For one embodiment, the incoming call may be screened by the user.

18 Claims, 4 Drawing Sheets

METHOD AND APPARATUS FOR PROVIDING A WIRELESS COMMUNICATION DEVICE WITH LOCAL AUDIO SIGNAL STORAGE

The present invention relates to computer systems and more particularly to providing a cell phone with the ability to provide answering machine functionality to the user with local audio signal storage.

BACKGROUND

Computer systems are becoming increasingly pervasive in our society, including everything from small handheld electronic devices, such as personal data assistants and cellular phones, to application-specific electronic devices, such as set-top boxes, digital cameras, and other consumer electronics, to medium-sized mobile systems such as notebook, sub-notebook, and tablet computers, to desktop systems, workstations, and servers. A cell phone is a particularly useful computer system that provides a convenient way not only for users to be contacted but also for users to contact others.

Many cell phone users pay for a voicemail service. Under this service, an incoming call to a cell phone that is not picked up by the cell phone owner is rerouted to a voicemail system. The caller may then leave a message for the cell phone owner in the voicemail system. The message may then be subsequently retrieved by the user when the user calls the voicemail service.

Aside from the cost, there are numerous drawbacks to this type of voicemail system. For example, one drawback is that the cell phone owner may be unable to retrieve messages from the system when communication via the cell phone is hindered by, for example, a lack of nearby cellular antennas or heavy cellular traffic. Another drawback is the lack of security associated with a remotely accessed voicemail system. The present invention addresses this and other problems associated with the prior art.

BRIEF DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, an answering machine is integrated with a cell phone. Messages received by the cell phone may be locally stored in a nonvolatile memory region of the cell phone for later retrieval by a user. The incoming call may also be screened by the user. In addition, for one embodiment, a message may be remotely retrieved by the user by calling the cell phone.

A more detailed description of embodiments of the present invention, including various configurations and implementations, is provided below.

Figure 1:
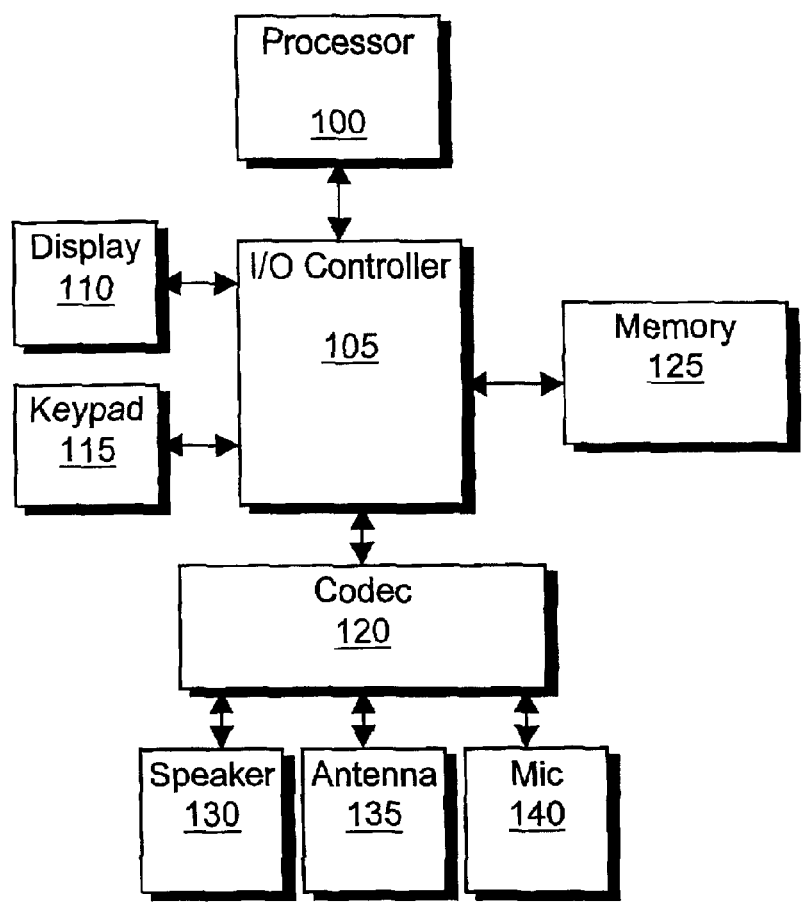
FIG. 1 includes a computer system formed in accordance with an embodiment of the present invention.

FIG. 1 shows a cell phone including processor 100. Processor 100 may communicate with memory 125, codec 120, display 110, and keypad 115 via input/output controller 105. Codec 120 may couple speaker 130, antenna 135, and microphone 140 to controller 105. In accordance with an embodiment of the present invention, a cell phone may include more or fewer components than those shown in FIG. 1, and the components of FIG. 1 may be partitioned differently. For example, multiple components may be integrated into a single component, and single components may be divided into multiple components. Note that the term "processor" may be used herein to refer to one or more of a central processing unit, a processor of a symmetric or asymmetric multiprocessing system, a digital signal processor, a micro-controller, etc.

For one embodiment of the present invention, speaker 130 of FIG. 1 may be an earpiece and microphone 140 may be a mouthpiece of the cell phone. For one embodiment, keypad 115 and display 110 may be combined into a single touch-sensitive display. Alternatively, some or all of the functions provided by keypad 115 may be implemented using voice-activated commands.

Memory 125 may include any machine-readable medium such as a magnetic disk (e.g. a hard drive or floppy disk), an optical disk (e.g. a CD or DVD), or a semiconductor device (e.g. Flash, EPROM, or RAM). For one embodiment of the present invention, memory 125 may be bifurcated into a volatile memory region and a nonvolatile memory region. The volatile memory region may be used by the cell phone as a high-speed, temporary storage space when the cell phone is turned on, and the nonvolatile memory region may be used as a long-term storage space for use when the cell phone is turned off. A method of an embodiment of the present invention may be implemented by the cell phone of FIG. 1 programmed to execute instructions associated with the method. These instructions may reside, at least in part, in memory 125. Note that the term "cell phone," as used herein, is intended to broadly cover any long-range wireless communication device, including, for example, satellite phones.

Figure 2:
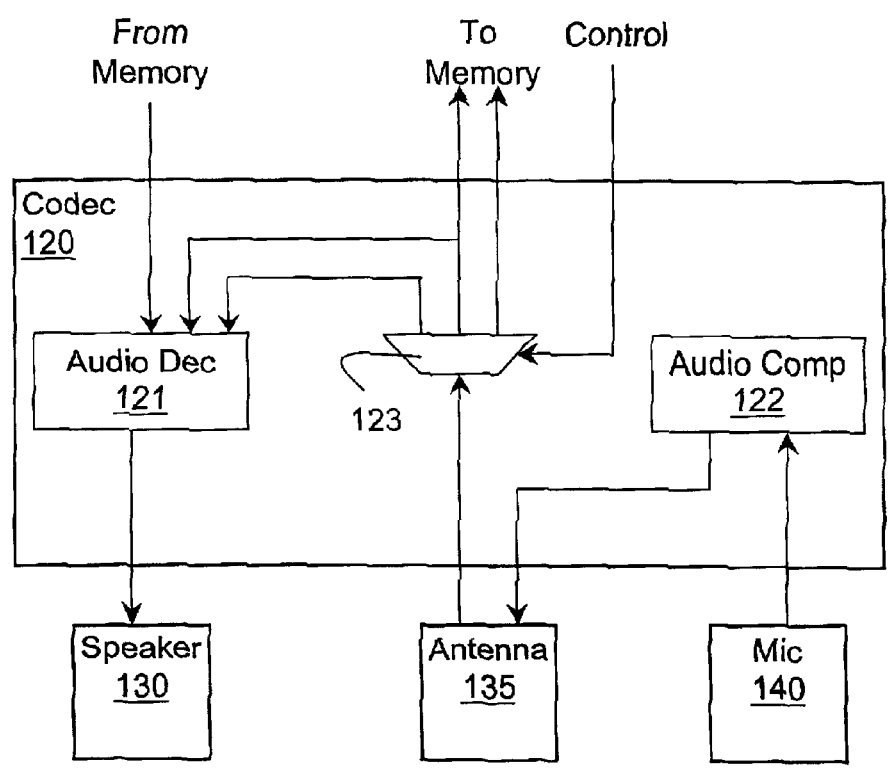
FIG. 2 includes a circuit formed in accordance with an embodiment of the present invention.

FIG. 2 includes a more detailed view of codec 120 in FIG. 1. The function of the codec of FIG. 2 is described below in conjunction with FIG. 3. As shown in FIG. 2, an input to audio compressor 122 of codec 120 may be coupled to an output of microphone 140. An output of audio compressor 122 may be coupled to antenna 135. Antenna 135 may be coupled to an input of demultiplexer 123. A first output of demultiplexer 123 may be coupled to an input of audio decompressor 121. A second output of demultiplexer 123 may be coupled to an input of audio decompressor 121 as well as to memory. A third output of demultiplexer 123 may be coupled to memory. A control signal may be coupled to a control input of demultiplexer 123 to control the demultiplexer. Memory may be coupled to an input of audio decompressor 121, the output of which may be coupled to speaker 130. Note that in accordance with one embodiment of the present invention, codec 120, including the audio compressor and decompressor, may be implemented using a software sequence executed by a processor, firmware, dedicated hardware, or any combination thereof.

Figure 3:
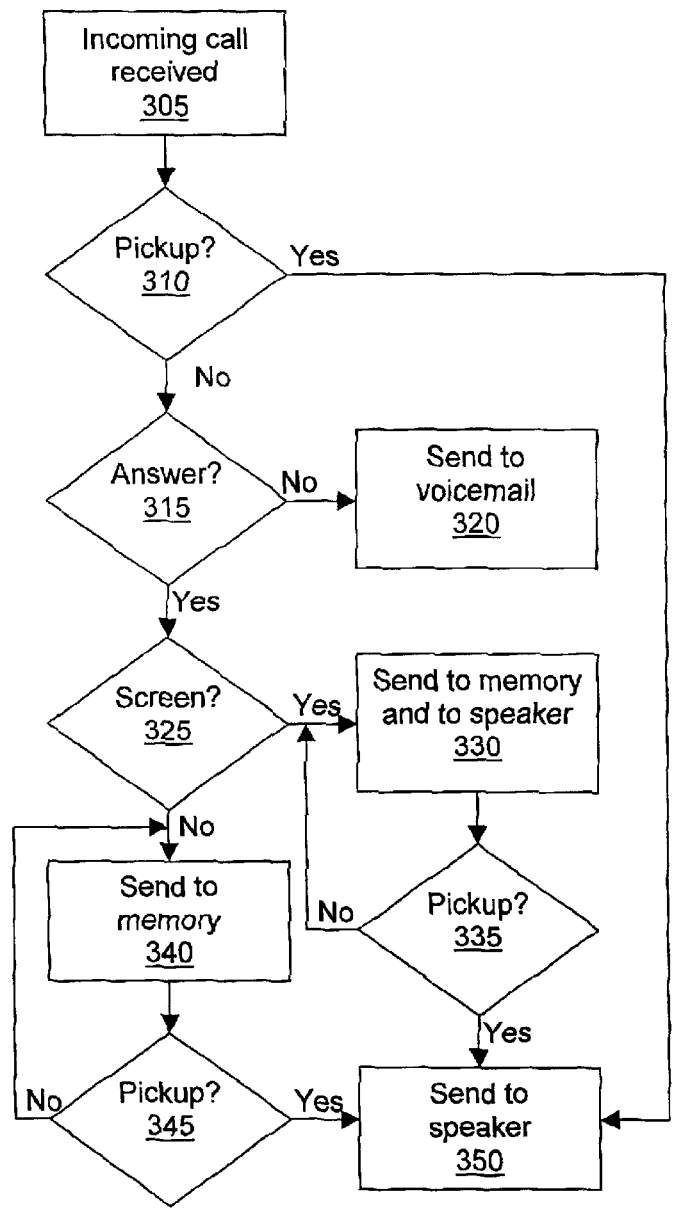
FIG. 3 includes a flow chart showing a method of an embodiment of the present invention.

FIG. 3 includes a flow chart showing a method of an embodiment of the present invention. This method is described below in conjunction with FIGS. 1 and 2.

At block 305 an incoming call is received. In accordance with one embodiment of the present invention, the cell phone may ring (or vibrate, flash, etc.) for a predetermined period of time before the incoming call may be answered by the answering machine function of the cell phone. This predetermined period of time may be set by the user.

In accordance with one embodiment of the present invention, if the user picks up the phone (i.e. answers the call), at block 310 of FIG. 3, within this predetermined period of time, the incoming call may be sent to the speaker at block 350. Sending the incoming call to the speaker may include decompressing the audio signal of the incoming call and routing the decompressed audio signal to the speaker, thereby allowing the user to hear the caller. To accomplish this, a control signal may be sent to demultiplexer 123 of codec 120 to route the signal from antenna 135 to audio decompressor 121, and from the audio decompressor to speaker 130.

For one embodiment of the present invention, the answering machine function of the cell phone may be active or inactive according to a user setting. If the incoming call is not picked up by the user within the predetermined period of time, it is determined if the answering machine function of the cell phone is active or inactive at block 315 of FIG. 3. If it is determined to be inactive, the incoming call may be routed to a voicemail system at step 320.

Thus, in accordance with an embodiment of the present invention, the answering machine function performed by the cell phone may compliment, rather than replace, a voicemail system. As another example of this complementary coexistence, if the cell phone is unable to receive the incoming call, the incoming call may be routed to the voicemail system. The cell phone may be unable to receive an incoming call if, for example, the cell phone is out of a cellular range, the cell phone is turned off, or heavy cellular traffic hinders the ability of the cell phone to receive the incoming call. For one embodiment of the present invention, the cell phone has the ability to receive a second incoming call, and to store an audio signal of the second incoming call, while the user is using the cell phone to receive a first incoming call. This may be accomplished by, for example, time multiplexing the two incoming calls on the same frequency (or frequency schedule for a frequency hopping protocol). Alternatively, this may be accomplished by enabling the cell phone to receive two separate incoming calls on two different frequencies simultaneously.

For one embodiment of the present invention, if the answering machine function of the cell phone is determined to be active at block 315, the process may proceed to block 325 of FIG. 3. At block 325 it may be determined if a screening function is active or inactive. Screening an incoming call includes an ability to listen to the incoming call while the call is being received and stored (recorded). In accordance with one embodiment of the present invention, the cell phone may provide this screening function if it has been activated by the user.

For one embodiment of the present invention, if the screening function is determined to be active at block 325 of FIG. 3, the incoming call may be automatically answered by the cell phone and sent to the cell phone memory and to the speaker at block 330. For one embodiment, the incoming call may be answered with a greeting that is prerecorded by the user. Sending the incoming call to the speaker may include decompressing the audio signal of the incoming call and routing the decompressed audio signal to the speaker, thereby allowing the user to hear the caller. Sending the incoming call to the cell phone memory may include routing the compressed audio signal of the incoming call to a nonvolatile memory region to store the audio signal. To accomplish this, a control signal may be sent to demultiplexer 123 to route the signal from antenna 135 to both audio decompressor 121 and to memory. Note that, as used herein, the storing of an audio signal may be interpreted as the storing of data representing the audio signal. This data may be, for example, compressed or uncompressed samples of the compressed or uncompressed audio signal.

In accordance with one embodiment of the present invention, an audio signal of an incoming call may be received by the cell phone in a compressed format. This compressed audio signal may be sent, in its compressed state, to the nonvolatile memory region of the cell phone for storage. Thus, the audio signal of the incoming call may be stored in the same compressed format in which it is received. Hence, in accordance with one embodiment, the same algorithm used to compress and decompress audio signals for transmission via the antenna of the cell phone may be used, wholly or in part, to compress and decompress audio signals for storage in the nonvolatile memory region. As a result, the same audio decompressor that is used to decompress an audio signal of an incoming call when it is picked up (as described above) may also be used to decompress a stored audio signal when the user retrieves a message (described below). In this manner, the implementation of additional compressors and decompressors to support the answering machine functionality described herein may be avoided, thereby reducing cost and size of the cell phone.

Note that in accordance with an embodiment of the present invention, other types of compression, coding, decompression, or decoding, may be done to signals sent to or from antenna 135 or other devices of the cell phone. For example, an incoming data packet associated with an incoming call may be unpacked to extract the incoming audio signal in accordance with a wireless communication protocol. Similarly, the outgoing audio signal may be packed into an outgoing data packet.

In accordance with one embodiment of the present invention, a user may screen the incoming call at block 330 of FIG. 3. If the user picks up the call at block 335 before the call ends, the audio signal of the incoming call is sent to the speaker at step 350 and, for one embodiment, not to the cell phone memory for storage. To accomplish this, a control signal may be sent to demultiplexer 123 of codec 120 to route the signal from antenna 135 to audio decompressor 121, and from the audio decompressor to speaker 130.

For one embodiment of the present invention, if the screening function is determined to be inactive at block 325 of FIG. 3, the incoming call may be automatically answered with the prerecorded greeting and sent to the cell phone memory at block 340. For one embodiment of the present invention, the audio signal is not sent to the speaker at block 340. Sending the incoming call to the cell phone memory may include routing the compressed audio signal of the incoming call to the nonvolatile memory region to store the audio signal. To accomplish this, a control signal may be sent to demultiplexer 123 to route the signal from antenna 135 to memory.

In accordance with one embodiment of the present invention, a user may not screen the incoming call at block 340 of FIG. 3. For one embodiment, if the user picks up the call at block 345 before the call ends, the audio signal of the incoming call is sent to the speaker at step 350. To accomplish this, a control signal may be sent to demultiplexer 123 of codec 120 to route the signal from antenna 135 to audio decompressor 121, and from the audio decompressor to speaker 130.

In accordance with one embodiment of the present invention, after the incoming call has been received and a message has been recorded by storing the audio signal of the incoming call in memory, the message may be retrieved by the user. For one embodiment of the present invention, the message may be retrieved directly from the cell phone via the keypad or voice commands. Alternatively, the message may be retrieved using a remote phone by, for example, calling the cell phone and entering a code. If the code matches a predefined code set by the user, the audio signal associated with the message may be automatically sent by the cell phone to the remote phone via the cell phone antenna.

For an alternate embodiment of the present invention, the recorded message may be downloaded from the cell phone to another computer system via a cable or wireless interface. For example, a user may download the message to a headset for convenient playback. Alternatively, the user may download the message to any other computer system for storage or playback. For this embodiment, the message may be transferred to the computer system in a compressed format, and decompressed by the computer system.

For one embodiment of the present invention, authentication techniques may be used to securely store and retrieve messages from the cell phone. For this embodiment, a user may be authenticated to the cell phone before retrieval of a message is permitted by the cell phone. For example, for one embodiment, message retrieval may be password protected such that a user is to enter a password (either into the key pad or through speech recognition) before message retrieval is permitted. This password may be predefined by the user, and stored in the cell phone in an encrypted format. Alternatively, the user may be authenticated to the cell phone by voice print identification, thumbprint identification, or any combination of techniques.

In accordance with one embodiment of the present invention, the answering machine functionality provided by the cell phone may include volume control, skip and repeat, new message playback and erase, message number count, caller ID, time and date stamping, voice prompts, etc. For one embodiment, these functions may be controlled using the cell phone key pad or using voice prompts.

Figure 4:
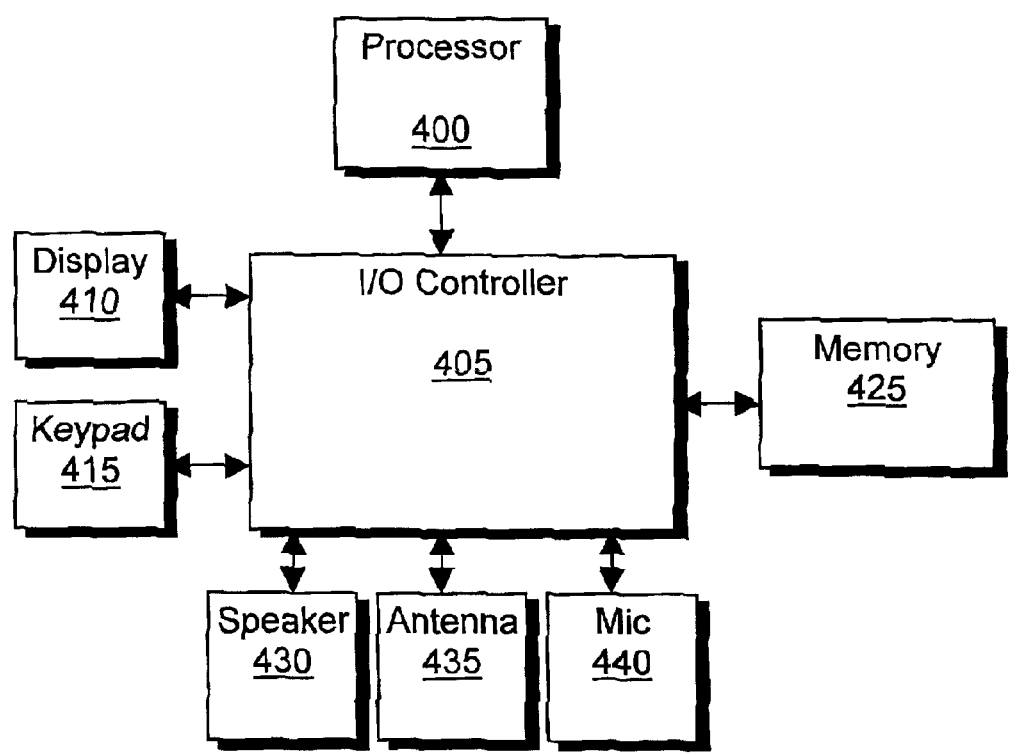
FIG. 4 includes a computer system formed in accordance with an embodiment of the present invention.

FIG. 4 shows a cell phone in accordance with an alternate embodiment of the present invention in which the functionality of codec 120 of FIG. 1 is implemented by processor 400 executing instructions stored in memory 425. These instructions may include, for example, compression and decompression algorithms used to compress and decompress audio signals. As described above, in accordance with one embodiment of the present invention, the same algorithm used to compress and decompress audio signals for transmission via the antenna of the cell phone may be used, wholly or in part, to compress and decompress audio signals for storage in the nonvolatile memory region of the cell phone.

As shown in FIG. 4, processor 400 may communicate with memory 425, microphone 440, antenna 435, speaker 430, display 410, and keypad 415 via input/output controller 405. In accordance with alternate embodiments of the present invention, a cell phone may include more or fewer components than those shown, and the components may be partitioned differently. For example, multiple components may be integrated into a single component, and single components may be divided into multiple components.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A system comprising:
   a cell phone having an antenna and a speaker;
   an answering machine integrated with the cell phone; and
   a nonvolatile memory region coupled to the answering machine to store an audio signal of an incoming call received via the antenna and answered by the answering machine, the cell phone including a codec to process the audio signal of the incoming call and the codec including
   a demultiplexer having an input, a first output, a second output, and a third output, the input being coupled to the antenna to receive the audio signal of the incoming, the first output being coupled to the nonvolatile memory region to store the audio signal in the nonvolatile memory region if the incoming call is not picked up within a predetermined period of time, and
   an audio decompressor having an output, a first input, a second input, and a third input, the output being coupled to the speaker, the first input being coupled to the third output of the demultiplexer, the second input being coupled to the second output of the demultiplexer, the third input being coupled to the nonvolatile memory region, the audio decompressor decompressing the audio signal of the incoming call received via one of the first and second inputs from the demultiplexer and routing via the output the decompressed audio signal to the speaker if the incoming call is picked up within the predetermined period of time.

2. The system of claim 1, wherein while in a playback mode, in response to a request from a user, the audio decompressor subsequently retrieves via the third input the stored audio signal from the nonvolatile memory region and routes via the output the retrieved audio signal to the speaker to allow the user to listen to the retrieved audio signal, if the incoming call is not picked up within a predetermined period of time.

3. The system of claim 1, wherein the audio decompressor is to decompress an audio signal of a first incoming call using a first audio decompression algorithm while the first incoming call is being received, and to decompress an audio signal of a second incoming call using a second audio decompression algorithm after the second incoming call has been received.

4. The system of claim 3, wherein the first and second audio decompression algorithms are to be implemented, at least in part, using a same software sequence, firmware, or hardware.

5. The system of claim 1, further comprising a software sequence, firmware, or hardware to enable the audio signal stored in the nonvolatile memory to be retrieved by calling the cell phone from a remote phone.

6. The system of claim 1, further comprising a software sequence, firmware, or hardware to authenticate the user to the cell phone before the audio signal stored in the nonvolatile memory is retrieved by the user.

7. The system of claim 2, wherein the demultiplexer is to direct via the second output of the demultiplexer the audio signal of the incoming call to both the audio decompressor to decompress the audio signal and to the nonvolatile memory region to store the audio signal if the incoming call is not picked up and a screening function is active.

8. The system of claim 7, wherein the demultiplexer is to direct via the third output of the demultiplexer the audio signal of the incoming call to the audio decompressor to decompress the audio signal, and not to the nonvolatile memory region to store the audio signal, if the incoming call is picked up.

9. The system of claim 8, wherein the demultiplexer is to direct via the first output of the demultiplexer the audio signal of the incoming call to the nonvolatile memory region to store the audio signal, and not to the audio decompressor to decompress the audio signal, if the incoming call is not picked up and a screening function is inactive.

10. A method comprising:

providing a cell phone with an integrated answering machine, the cell phone having an antenna, a speaker, and a nonvolatile memory region; and enabling a user of the cell phone to screen an incoming call, the cell phone including a codec to process the incoming call and the codec including a demultiplexer having an input, a first output, a second output, and a third output, the input being coupled to the antenna to receive the audio signal of the incoming, the first output being coupled to the nonvolatile memory region to store the audio signal in the nonvolatile memory region if the incoming call is not picked up within a predetermined period of time, and an audio decompressor having an output, a first input, a second input, and a third input, the output being coupled to the speaker, the first input being coupled to the third output of the demultiplexer, the second input being coupled to the second output of the demultiplexer, the third input being coupled to the nonvolatile memory region, the audio decompressor decompressing the audio signal of the incoming call received via one of the first and second inputs from the demultiplexer and routing via the output the decompressed audio signal to the speaker if the incoming call is picked up within the predetermined period of time.

11. The method of claim 10, wherein enabling the user to screen an incoming call includes providing the cell phone with an option to activate or inactivate a screening function.

12. The method of claim 10, further comprising enabling the cell phone to record an audio signal of a second incoming call while a first incoming call is being received.

13. The method of claim 10, further comprising enabling the user to retrieve messages from the cell phone by calling the cell phone from a remote phone.

14. The method of claim 10, further comprising enabling the user to download messages from the cell phone to a computer system for storage, playback, or audio decompression.

15. A system comprising:

a processor;

a speaker;

an antenna;

a memory region; and a codec to process an audio signal of an incoming call, the codec including a demultiplexer having an input, a first output, a second output, and a third output, the input being coupled to the antenna to receive the audio signal of the incoming, the first output being coupled to the memory region to store the audio signal in the memory region if the incoming call is not picked up within a predetermined period of time, and an audio decompressor having an output, a first input, a second input, and a third input, the output being coupled to the speaker, the first input being coupled to the third output of the demultiplexer, the second input being coupled to the second output of the demultiplexer, the third input being coupled to the memory region, the audio decompressor decompressing the audio signal of the incoming call received via one of the first and second inputs from the demultiplexer and routing via the output the decompressed audio signal to the speaker if the incoming call is picked up within the predetermined period of time.

16. The system of claim 15, further comprising a speaker and instructions that, if executed by the processor, cause the system to screen the incoming call via the speaker.

17. The system of claim 16, further comprising instructions that, if executed by the processor, cause the system to screen the incoming call if it is determined that a screening function is active.

18. The system of claim 15, further comprising instructions that, if executed by the processor, cause the system to perform a message retrieval by sending the audio signal stored in the memory region via the antenna.

* * * * *